(12) United States Patent
Yamauchi et al.

(10) Patent No.: US 11,870,118 B2
(45) Date of Patent: Jan. 9, 2024

(54) FUEL CELL SYSTEM

(71) Applicants: KYOCERA CORPORATION, Kyoto (JP); DAINICHI CO., LTD., Niigata (JP)

(72) Inventors: Kyosuke Yamauchi, Kirishima (JP); Naoki Yokoo, Niigata (JP); Hidetaka Ikarashi, Niigata (JP); Yutaro Sakata, Niigata (JP); Hiroyuki Sato, Niigata (JP)

(73) Assignees: KYOCERA Corporation, Kyoto (JP); DAINICHI CO., LTD., Niigata (JP)

(*) Notice: Subject to any disclaimer, the term of this patent is extended or adjusted under 35 U.S.C. 154(b) by 0 days.

(21) Appl. No.: 17/615,854

(22) PCT Filed: Jun. 2, 2020

(86) PCT No.: PCT/JP2020/021806
§ 371 (c)(1),
(2) Date: Dec. 2, 2021

(87) PCT Pub. No.: WO2020/246475
PCT Pub. Date: Dec. 10, 2020

(65) Prior Publication Data
US 2022/0293984 A1 Sep. 15, 2022

(30) Foreign Application Priority Data
Jun. 4, 2019 (JP) .................................. 2019-104376

(51) Int. Cl.
*H01M 8/0612* (2016.01)
*H01M 8/0438* (2016.01)
(Continued)

(52) U.S. Cl.
CPC ..... *H01M 8/0618* (2013.01); *H01M 8/04425* (2013.01); *H01M 8/04537* (2013.01); *H01M 8/04776* (2013.01); *H01M 2008/1293* (2013.01)

(58) Field of Classification Search
None
See application file for complete search history.

(56) References Cited

U.S. PATENT DOCUMENTS

| | | | |
|---|---|---|---|
| 6,500,573 | B1 | 12/2002 | Shimazu et al. |
| 2014/0342257 | A1 | 11/2014 | Tsukagoshi et al. |

FOREIGN PATENT DOCUMENTS

| | | |
|---|---|---|
| JP | 2003238105 A | 8/2003 |
| JP | 2010170900 A | 8/2010 |

(Continued)

*Primary Examiner* — Jonathan Crepeau
(74) *Attorney, Agent, or Firm* — VIERING, JENTSCHURA & PARTNER MBB

(57) ABSTRACT

A fuel cell system includes a fuel cell that generates power using a fuel gas and an oxygen-containing gas, a reformer including a vaporizing section and a reforming section, a raw fuel supply that supplies raw fuel, a reformed water supply that supplies reformed water, and a controller. The controller has multiple calculation formulas for calculating an amount of reformed water to be used in the reforming section in response to a requested power level from an external unit, and selects, based on an increase or a decrease in a requested current level from the external unit, a formula from the multiple calculation formulas in response to the increase in the requested current level, and a formula different from the formula to be selected for the increase from the multiple calculation formulas in response to the decrease in the requested current level.

4 Claims, 6 Drawing Sheets

(51) Int. Cl.
*H01M 8/04746* (2016.01)
*H01M 8/04537* (2016.01)
*H01M 8/12* (2016.01)

(56) References Cited

FOREIGN PATENT DOCUMENTS

| | | |
|---|---|---|
| JP | 2010212141 A | 9/2010 |
| JP | 2012218947 A | 4/2014 |
| WO | 2013111777 A1 | 8/2013 |

FUEL CELL SYSTEM

CROSS-REFERENCE TO RELATED APPLICATIONS

This application is a national stage entry according to 35 U.S.C. § 371 of PCT Application No. PCT/JP2020/021806 filed on Jun. 2, 2020, which claims priority to Japanese Application No. 2019-104376 filed on Jun. 4, 2019, which are entirely incorporated herein by reference.

FIELD

The present disclosure relates to a fuel cell system.

BACKGROUND

Known techniques are described in, for example, Patent Literature 1 and Patent Literature 2.

CITATION LIST

Patent Literature

Patent Literature 1: Japanese Unexamined Patent Application Publication No. 2010-170900
Patent Literature 2: Japanese Unexamined Patent Application Publication No. 2012-218947

BRIEF SUMMARY

A fuel cell system according to an aspect of the present disclosure includes a fuel cell that generates power using a fuel gas and an oxygen-containing gas, a reformer including a vaporizing section that vaporizes reformed water into steam and a reforming section that causes the steam to react with a raw fuel to generate the fuel gas through a steam reforming reaction, a raw fuel supply that supplies the raw fuel to the reforming section, a reformed water supply that supplies the reformed water to the vaporizing section, and a controller.

The controller has a plurality of calculation formulas for calculating an amount of reformed water to be used in the reforming section in response to a requested power level from an external unit. The plurality of calculation formulas include a formula to be selected in response to an increase in a requested current level from the external unit and a formula to be selected in response to a decrease in the requested current level from the external unit. The formula to be selected in response to the increase is different from the formula to be selected in response to the decrease.

BRIEF DESCRIPTION OF DRAWINGS

The objects, features, and advantages of the present disclosure will become more apparent from the following detailed description and the drawings.

DETAILED DESCRIPTION

Figure 1:
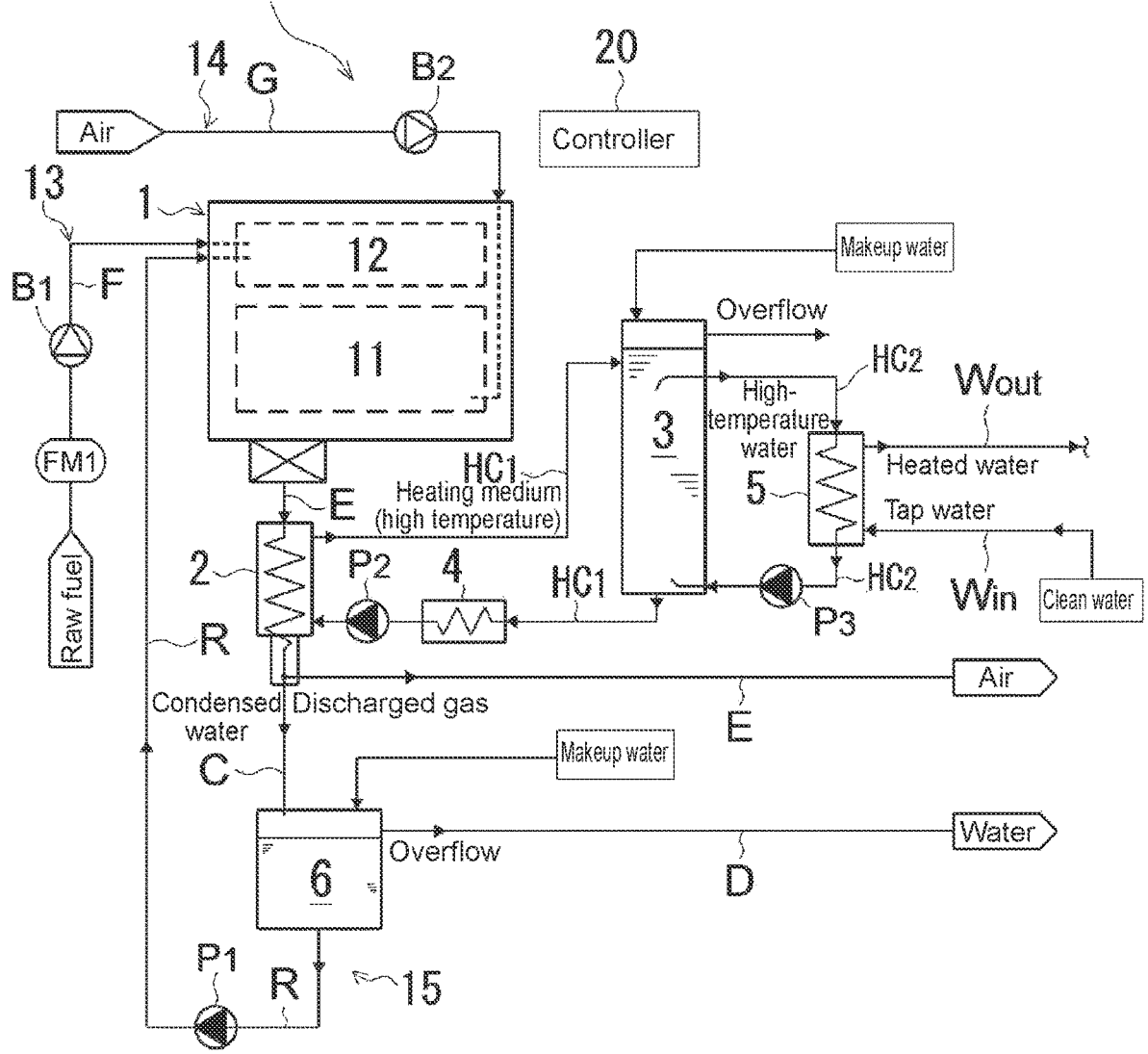
FIG. 1 is a schematic diagram of a fuel cell system according to an embodiment of the present disclosure.

A fuel cell system according to one or more embodiments of the present disclosure will now be described with reference to the drawings.

A fuel cell system with the structure that forms the basis of the fuel cell system according to one or more embodiments of the present disclosure will be described first.

A fuel cell system including solid oxide fuel cells (SOFCs) includes a controller that controls the operations of a raw fuel supply and an oxygen-containing gas supply to supply, to each unit cell, a raw fuel gas (hydrogen-containing gas) and air (oxygen-containing gas) in amounts intended for power generation. Direct current (DC) resulting from power generation is converted to alternating-current (AC) power by a power regulator such as a power conditioner. The AC power is then supplied to an external load as requested from an external device (external load) that is connected to the power regulator.

A raw fuel such as utility gas or liquefied petroleum (LP) gas supplied to the fuel cell system undergoes steam reforming in a reformer to generate reformed gas (hydrogen rich gas), which is then supplied as a fuel gas to a cell stack.

More specifically, in a steady state or a normal operation of the fuel cell system in which the generation power level (generation current level) is maintained constant, the raw fuel and the reformed water are supplied at the same time to the reformer in amounts predetermined per unit time (flow rate). In the reformer, a vaporizing section generates steam from evaporation of reformed water supplied from the reformed water supply, and a reforming section receives the steam and causes the raw fuel supplied from the raw fuel supply to undergo steam reforming to generate the fuel gas (reformed gas).

The ratio (flow rate) of the raw fuel (gas) and the reformed water (liquid) mixed in the reformer is within a varying range predetermined through calculation as the molar ratio of steam ($H_2O$ or steam) to carbon contained in the raw fuel supplied to the reformer. This ratio is hereafter referred to as the S/C ratio. For example, in the steady state in which the generation current level is maintained constant, the S/C ratio is typically maintained at a predetermined value (preset value) within a range of 1.5 to 3.5 or at a target value.

The above S/C ratio may be used as a reference or a target for the generation power level (generation current level) of the cell stack when the generation power level of the fuel cell system is to be varied.

A fuel cell system including SOFCs has an operation (or mode) defined by specifications called a load-following operation mode or a partial load operation mode in which a target generation power level (current level) is varied in response to a requested power level from an external load. During the load-following operation, however, the flow rate of raw fuel and the flow rate of reformed water change at different degrees of responsiveness to changes in the requested power from an external load. This may cause the S/C ratio to decrease temporarily. The decrease in the S/C ratio may degrade the cell stack.

A fuel cell system 100 according to an embodiment shown in FIG. 1 includes a fuel cell module 1 that generates power using a fuel gas and an oxygen-containing gas and auxiliary devices for assisting independent power generation of the fuel cell. The auxiliary devices include a raw fuel supply 13 including a fuel pump B1 and a raw fuel channel F, an oxygen-containing gas supply 14 including an air blower B2 and an air channel G, and a reformed water supply 15 including a reformed water tank 6, a reformed water pump P1, and a reformed water channel R for supplying reformed water from the reformed water tank 6 to a reformer 12.

The fuel cell system 100 further includes a power regulator such as a power conditioner (not shown) as an auxiliary device that supplies power to an external unit and coordinates with the electrical grid, and a controller 20 that controls the operation of the auxiliary devices assisting the power generation operation of the fuel cell as described above in cooperation with the power regulator. The power regulator includes an ammeter (in amperes) and a voltmeter (in volts) for measuring generated power.

The fuel cell system 100 according to the embodiment further includes a waste heat recovery system (heat cycle HC1). The waste heat recovery system includes a heat exchanger 2, a heat storage tank 3 (also referred to as a hot water tank), a heat dissipater (radiator 4), channel pipes connecting these components, and a heating medium pump P2.

The fuel cell system 100 shown in FIG. 1 further includes a second heat exchanger 5 (also referred to as a clean water heat exchanger) for heating tap water (clean water) to be supplied to an external unit, and a hot water supply system (heat cycle HC2). The hot water supply system includes a heat pump P3 and a circulation pipe for receiving and circulating a high-temperature heating medium from the heat storage tank 3. The fuel cell system may be used as a monogeneration system that does not supply hot water to an external unit.

Figure 2:
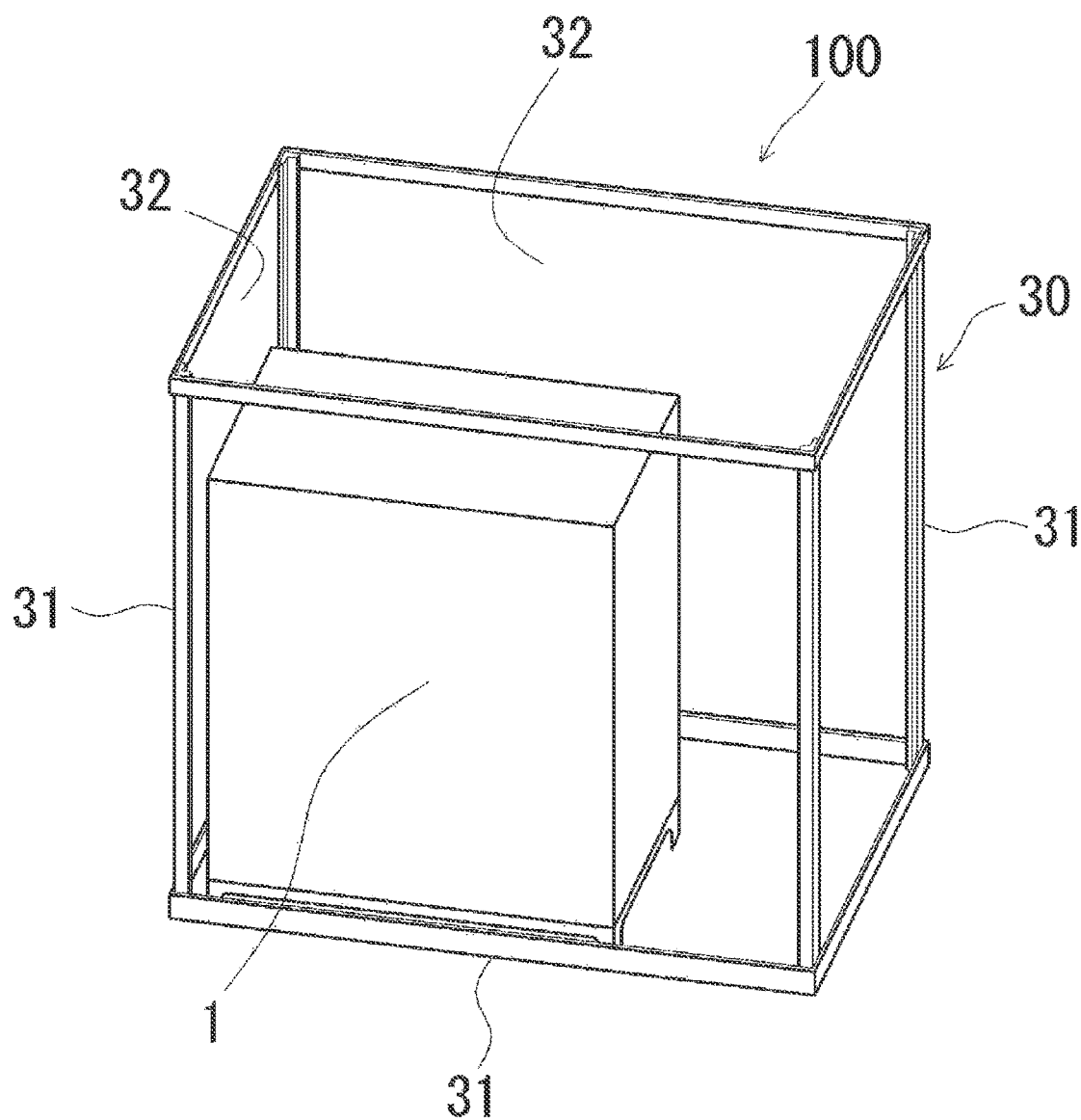
FIG. 2 is a perspective view of the fuel cell system housed in an external case.

The fuel cell system 100 is housed in a case 30 as shown in FIG. 2. The case 30 includes frames 31 and exterior panels 32. The case 30 further contains multiple measurement devices, sensors, and other devices on and around the fuel cell module 1 and the auxiliary devices, channels, and piping.

For example, a raw fuel flowmeter FM1 is installed on the raw fuel channel F in the raw fuel supply 13, which supplies a raw fuel (gas) to the reformer 12 in the fuel cell module 1. The raw fuel flowmeter FM1 measures the flow rate per unit time of the raw fuel (fuel gas before reforming) such as utility gas supplied to a cell stack 11.

The reformer 12 includes a left section in the figure for supplying the raw fuel and the reformed water as a vaporizing section for evaporating and vaporizing the supplied reformed water and an opposing right section in the figure as a reforming section filled with a reforming catalyst or others for processing the raw fuel through steam reforming. The raw fuel undergoes steam reforming in the reforming section to generate a fuel gas (hydrogen rich gas), which is then supplied to the cell stack 11.

Although not shown, a similar air flowmeter or another instrument is also installed on the air channel G in the oxygen-containing gas supply 14 that supplies air to the cell stack 11 in the fuel cell module 1.

The fuel cell system 100 may also include multiple temperature meters or thermometers (not shown), such as temperature sensors and thermistors for measuring the temperature of the components of the fuel cell.

The controller 20 that centrally controls the operation of the fuel cell system 100 is connected to a memory and a display (both not shown) and to various components and various sensors included in the fuel cell system 100. The controller 20 controls and manages these functional components and thus controls and manages the entire fuel cell system 100. The controller 20 also obtains a program stored in its memory, and executes the program to implement various functions of the components of the fuel cell system 100.

To transmit control signals or various types of information from the controller 20 to the other functional components or devices, the controller 20 may be connected to the other functional components either with wires or wirelessly. The particular control performed by the controller 20 in the present embodiment will be described later.

In the present embodiment, the controller 20 specifically controls the operations of the fuel pump B1 in the raw fuel supply 13 that supplies a raw fuel gas to the reformer 12 and the air blower B2 in the oxygen-containing gas supply 14 based on the level of power requested from an external load, instructions and commands from an external unit (e.g., a water heater) connected to the fuel cell system, measurement values of, for example, an ammeter indicating the level of power supply to an external unit and a voltmeter (e.g., apparent power in volt-amperes), or measurement values of various sensors listed above.

More specifically, the controller 20 in the fuel cell system 100 with the structure described above controls the operations of the raw fuel supply 13 and the oxygen-containing gas supply 14 to supply, to each unit cell, a fuel gas and an oxygen-containing gas in amounts intended for operation. This causes the unit cells to generate power and a flow of DC through the unit cells. The power generated by the unit cells is converted to AC power by the power regulator and is supplied to an external load.

For the load-following operation or the partial load operation, the controller 20 in the fuel cell system 100 according to the present embodiment determines, through predetermined calculation defined separately, the amount of fuel gas (reformed gas) for the target generation power level to be supplied to the cell stack 11 per unit time (hereafter, the flow rate) in response to an instruction to increase or decrease the target generation current level of the fuel cell set initially by the power regulator (power conditioner, not shown), and also determines the flow rate of raw fuel gas to be used to generate the reformed gas at the determined flow rate.

The flow rate of the raw fuel gas used to generate the reformed gas described above is determined uniquely for the target generation current level based on the scale (or the number) of fuel cells or cell stack(s) in the fuel cell system, its specifications, performance, and other factors, and is a fixed value for each target generation current level.

The flow rate of the reformed water to be fed into the reformer 12 at the same time as the raw fuel gas and mixed with the raw fuel is determined using a calculation formula defined for the reformed water flow rate. The calculation formula defined for the reformed water flow rate includes the S/C ratio and the flow rate of the raw fuel gas as elements or items. The controller 20 has multiple calculation formulas defined for the reformed water flow rate, and performs control for selecting a different calculation formula defined for the reformed water flow rate in response to an increase or a decrease in a requested current level from an external unit.

The controller 20 calculates the flow rate of the reformed water using a different calculation formula in response to an increase or a decrease in a requested current level from an external unit to reduce the likelihood that the S/C ratio decreases temporarily in accordance with changes and variations in the requested power level. This structure reduces deterioration of the cell stack.

The controller 20 may have, as the multiple calculation formulas defined for the reformed water flow rate, a first calculation formula and a second calculation formula defined for the reformed water flow rate. The first calculation formula defined for the reformed water flow rate uses a measured flow rate of the raw fuel gas obtained by measurement performed by the raw fuel flowmeter FM1. The second calculation formula defined for the reformed water flow rate uses a target flow rate (also referred to as an instructed flow rate or a preset flow rate) for the raw fuel gas calculated by the controller 20 in accordance with a requested power level.

The controller 20 selects the first calculation formula defined for the reformed water flow rate in response to a decrease in a requested current level from an external unit and selects the second calculation formula defined for the reformed water flow rate in response to an increase in a requested current level from an external unit. The controller 20 further calculates the flow rate of the reformed water based on the flow rate of the raw fuel gas corresponding to the selected calculation formula defined for the reformed water flow rate and the S/C ratio or other information preset based on the driving state of the fuel cell system.

The flow rate control for the raw fuel gas and the reformed water to be fed into the reformer 12 to increase or decrease the generation power level (generation current level) of the fuel cell in response to an increase or a decrease in the power level requested by an external load will now be described with reference to the drawings.

First Embodiment

Figure 3:
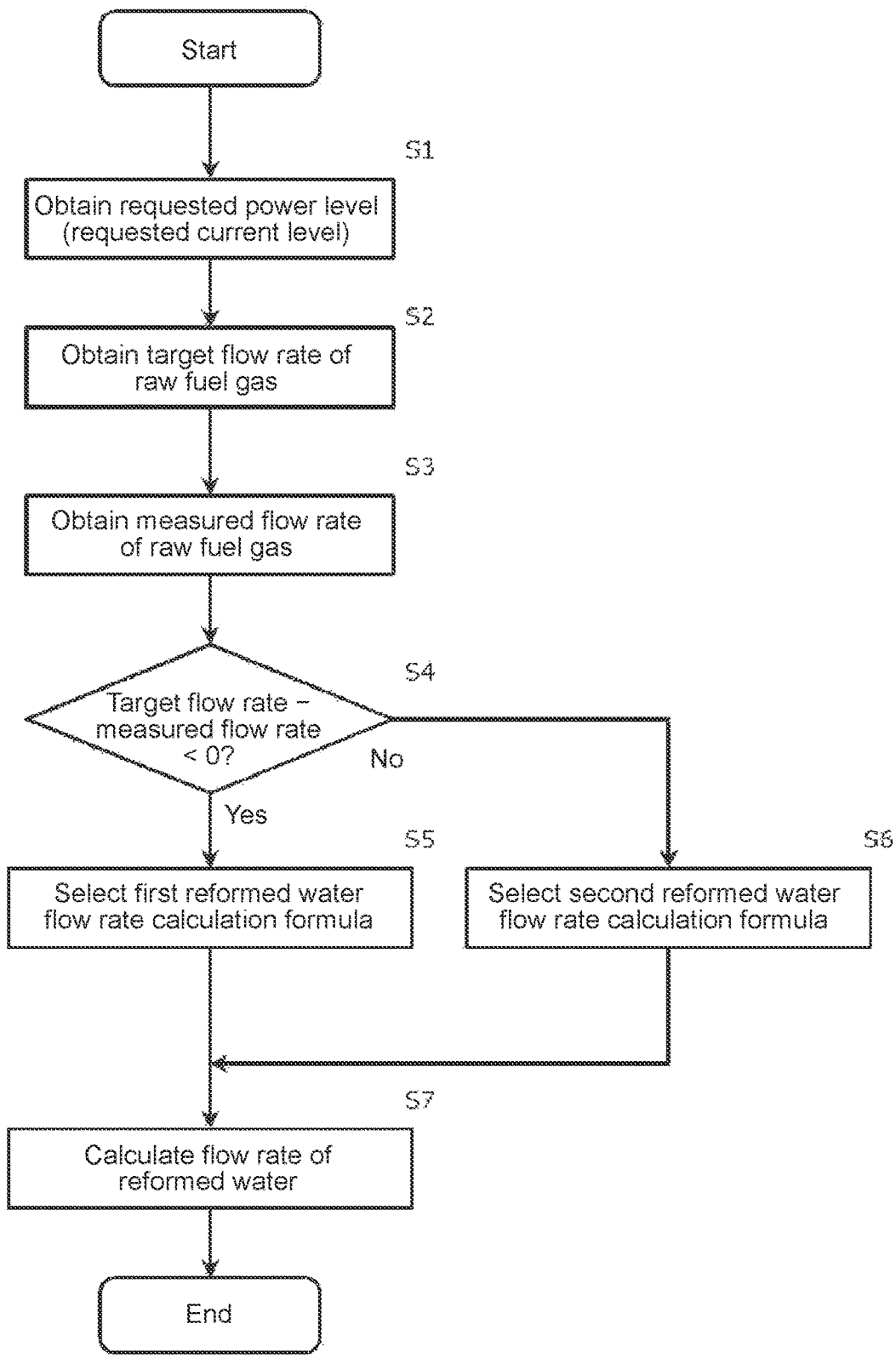
FIG. 3 is a flowchart of reformed water flow rate calculation in a first embodiment.

FIG. 3 is a flowchart of a calculation process performed by the controller 20 for calculating the reformed water flow rate in response to the generation power level requested from an external unit in a first embodiment. The start of the process in the flowchart means the start of the power generation operation of the fuel cell system. In the power generation operation, the fuel cell system is controlled to repeat the process in the flowchart (in a loop) during power generation.

In this flowchart, symbol S represents a step, Yes represents an affirmative result (with a computer flag indicating 1) in the determination, and No represents a negative result (with a computer flag indicating 0) in the determination. In the flowchart of FIG. 3, steps S4, S5, and S6 correspond to the calculation formula selection control.

In step S1, information about the power level (current level) requested from an external unit is obtained when the fuel cell system 100 starts the power generation operation. In step S2, the target flow rate of the raw fuel gas to be used to generate the fuel gas (reformed gas) to be supplied to the cell stack 11 in response to the requested power level is determined through predetermined calculation. In subsequent step S3, the measured flow rate of the raw fuel gas is obtained by measurement performed by the raw fuel flowmeter FM1.

In step S4, the difference between the target flow rate and the measured flow rate of the raw fuel gas is calculated. In response to a decrease in the requested power level, the cell stack 11 consumes less reformed gas for power generation. Thus, the target flow rate of the raw fuel gas decreases in response to the decrease in the requested power level to have a difference of less than 0 between the target flow rate and the measured flow rate of the raw fuel gas. In this case, the determination result is affirmative. In this case, the first calculation formula defined for the reformed water flow rate is selected in step S5.

In response to an increase in the requested power level, the cell stack 11 consumes more reformed gas for power generation. Thus, the target flow rate of the raw fuel gas increases in response to the increase in the requested power level to have a difference greater than or equal to 0 between the target flow rate and the measured flow rate of the raw fuel gas. In this case, the determination result is negative. In this case, the second calculation formula defined for the reformed water flow rate is selected in step S6.

When the target flow rate and the measured flow rate of the raw fuel gas have a difference of 0 in step S4 in the present embodiment, the second calculation formula defined for the reformed water flow rate is selected. However, the calculation formula defined for the reformed water flow rate selected in the immediately preceding loop, or specifically the (n−1)-th loop for the n-th loop (n is an integer greater than or equal to 2), may continue to be selected.

In step S7, the flow rate of the reformed water is calculated finally based on the selected calculation formula defined for the reformed water flow rate. The flow rate of the reformed water is calculated continuously in the power generation operation. The process in the flowchart may thus be started again in a loop from step S1.

FIGS. 4A to 4F are timing charts showing changes in the flow rate of the raw fuel gas and the flow rate of the reformed water in the fuel cell system according to the first embodiment in response to changes in the requested power level. FIGS. 5A to 5F are timing charts showing changes in the flow rate of a raw fuel gas and the flow rate of reformed water in a fuel cell system with the structure that forms the basis of the fuel cell system according to one or more embodiments of the present disclosure in response to changes in the requested power level.

Figure 4A:
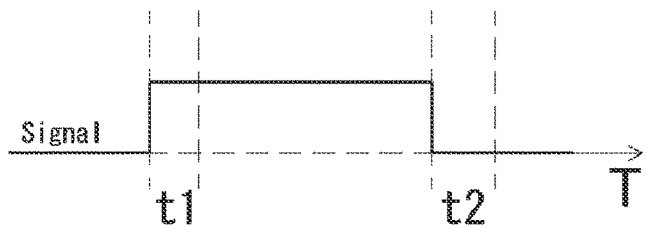
FIG. 4A is a timing chart of a signal carrying an instruction to increase or decrease a requested power level in the fuel cell system according to an embodiment.
Figure 4B:
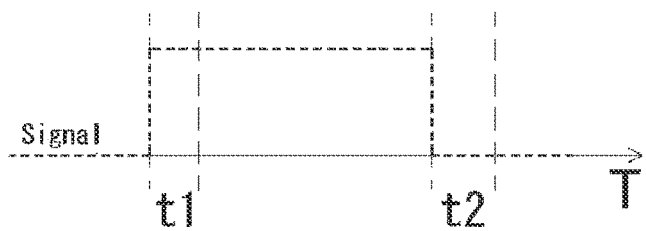
FIG. 4B is a timing chart of a signal carrying an instruction to increase or decrease a flow rate for a fuel pump.
Figure 4C:
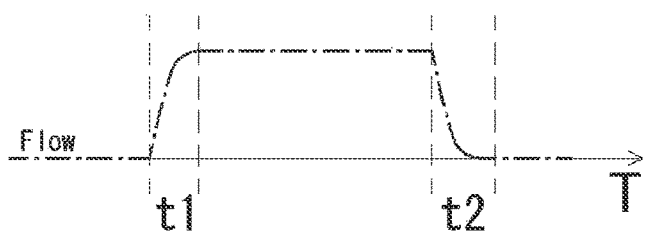
FIG. 4C is a timing chart of measurement values showing changes in the flow rate of raw fuel fed into a reformer.
Figure 4D:
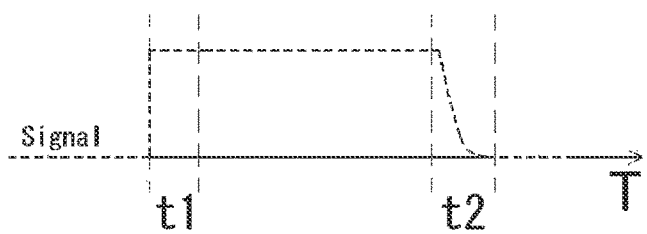
FIG. 4D is a timing chart of a signal carrying an instruction to increase or decrease a flow rate for a reformed water pump.
Figure 4E:
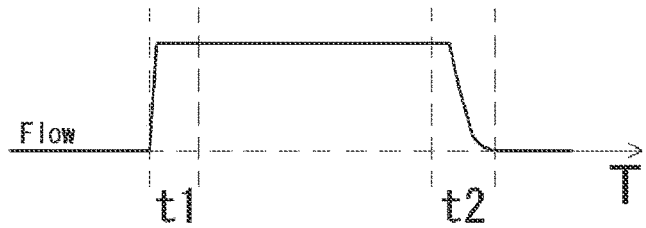
FIG. 4E is a timing chart of measurement values showing changes in the flow rate of reformed water fed into the reformer.
Figure 4F:
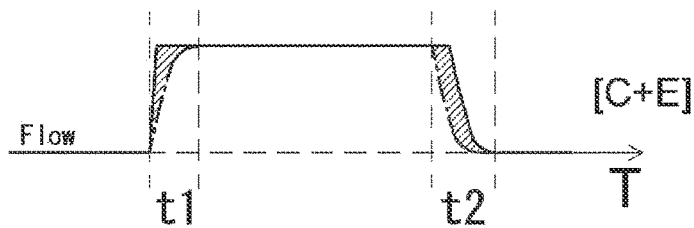
FIG. 4F is a timing chart of measurement values showing changes in the flow rate of raw fuel and changes in the flow rate of reformed water in comparison with each other.

Of the timing charts of FIGS. 4A to 4F for the fuel cell system according to the first embodiment, FIG. 4A shows changes in a signal carrying an instruction to increase or decrease the requested power level (preset values indicated by a solid line), FIG. 4B shows changes in a signal carrying an instruction to increase or decrease the flow rate for the fuel pump (instructive values indicated by a dotted line), FIG. 4C shows changes in the flow rate of the raw fuel fed into the reformer (theoretical values or measured values indicated by a dot-and-dash line), FIG. 4D shows changes in a signal carrying an instruction to increase or decrease the flow rate for the reformed water pump (instructive values indicated by a dotted line), FIG. 4E shows changes in the flow rate of the reformed water fed into the reformer (theoretical values or measured values indicated by a thick line), and FIG. 4F is a combination of FIGS. 4C and 4E showing a graph comparing the changes in the inflow amount of the fed raw fuel (a dot-and-dash line) and the changes in the inflow amount of the fed reformed water (a thick line) at the inlet of the vaporizing section.

Figure 5A:
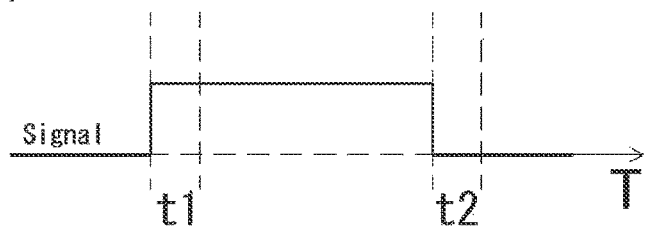
FIG. 5A is a timing chart of a signal carrying an instruction in a fuel cell system with the structure that forms the basis of the fuel cell system according to one or more embodiments of the present disclosure.
Figure 5B:
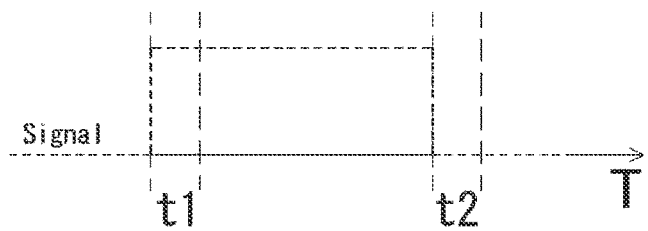
FIG. 5B is a timing chart of a signal carrying an instruction to increase or decrease a flow rate for a fuel pump.
Figure 5C:
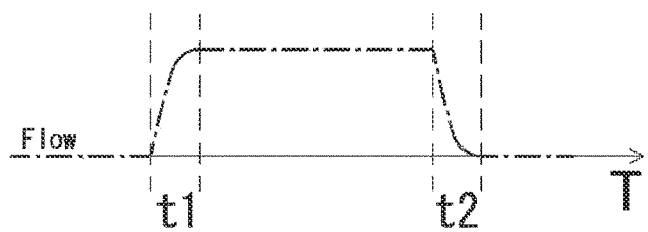
FIG. 5C is a timing chart of measurement values showing changes in the flow rate of raw fuel fed into a reformer.
Figure 5D:
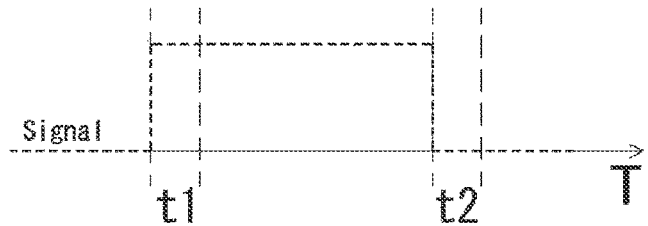
FIG. 5D is a timing chart of a signal carrying an instruction to increase or decrease a flow rate for a reformed water pump.
Figure 5E:
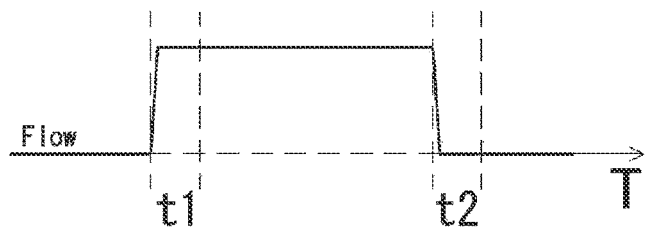
FIG. 5E is a timing chart of measurement values showing changes in the flow rate of reformed water fed into the reformer.
Figure 5F:
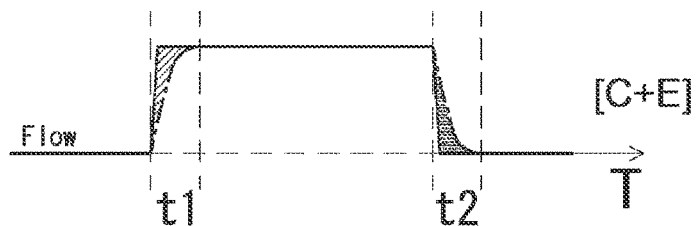
FIG. 5F is a timing chart of measurement values showing changes in the flow rate of raw fuel and changes in the flow rate of reformed water in comparison with each other.

Of the timing charts of FIGS. 5A to 5F for the fuel cell system with the structure that forms the basis of the fuel cell system according to one or more embodiments of the present disclosure, FIG. 5D shows a signal carrying an instruction to increase or decrease the flow rate for the reformed water pump (instructive values indicated by a dotted line), FIG. 5E shows changes in the flow rate of the reformed water fed into the reformer (theoretical values or measured values indicated by a thick line), and FIG. 5F is a combination of FIGS. 5C and 5E showing a graph comparing the changes in the inflow amount of the fed raw fuel (a dot-and-dash line) and the changes in the inflow amount of the fed reformed water (a thick line) at the inlet of the vaporizing section. FIGS. 5A to 5C are the same as the corresponding timing charts of FIGS. 4A to 4C.

In the figures, a section t1 is an increase-control section showing changes in the flow rate of the raw fuel gas and the flow rate of the reformed water in response to an increase in the requested power level, and a section t2 is a decrease-control section showing changes in the flow rate of the raw fuel gas and the flow rate of the reformed water in response to a decrease in the requested power level.

In the figures, a hatched area indicates a portion in which the amount of reformed water is larger (the S/C ratio is higher) than a proper amount of reformed water defined for the inflow amount of the raw fuel in the reformer, and a dotted area indicates a portion in which the amount of reformed water is smaller (the S/C ratio is lower) than a proper amount of reformed water defined for the inflow amount of the raw fuel in the reformer.

The controller 20 included in the fuel cell system 100 according to the present embodiment determines the flow rate of the raw fuel gas based on an instruction to increase or decrease the target generation current level of the fuel cell preset by the power conditioner (refer to FIG. 4A).

Once the raw fuel flow rate (target flow rate value) is determined, the controller 20 transmits an instructive value (target flow rate value) to the fuel pump B1 to feed the raw fuel gas without any delay from the instructed timing (shown in FIG. 4A) to increase or decrease the target generation current level shown in FIG. 4B.

In the section t1, a time lag occurs between when an instruction is provided to increase the pump feed amount in response to an increase in the target flow rate value and when the flow rate of the raw fuel fed into the reformer 12 reaches the target flow rate, thus causing a delay as shown in FIG. 4C.

More specifically, in the section t1, or the increase-control section in which the raw fuel flow rate increases, the actual flow rate of the raw fuel starts increasing after a delay from the instructed timing to increase the pump feed amount, and then changes as indicated by the curve shown in FIG. 4C before reaching the instructed target flow rate (preset flow rate). This is due to a long response time taken by the pump for feeding the raw fuel gas after receiving an instruction to increase or decrease the feeding pressure.

Similarly, in the section t2, the actual flow rate of the raw fuel decreases after a delay from the instructed timing to reduce the pump feed amount. More specifically, as shown in the section t2 in FIG. 4C, the flow rate decreases as indicated by the curve similarly to the section t1 to the instructed target flow rate (preset flow rate).

In this manner, the amount and the flow rate of the raw fuel gas fed into the reformer 12 are instructed and controlled in the same manner for both the increase-control section t1 and the decrease-control section t2 based on the flow rate calculated using the same requested generation power level (reference value) for the requested power.

Unlike for the raw fuel gas described above, the flow rate of the reformed water to be fed into the reformer 12 at the same time as the raw fuel gas and mixed with the raw fuel is instructed and controlled based on the flow rate calculated using different references between the increase-control section t1 and the decrease-control section t2.

More specifically, an instruction provided to the reformed water pump P1 in the increase-control section t1 causes, through the calculation formula selection control, selection of the second calculation formula defined for the reformed water flow rate to perform calculation based on the target value (instructive value) for the raw fuel flow rate (refer to the section t1 in FIG. 4D).

In contrast, an instruction provided to the reformed water pump P1 in the decrease-control section t2 causes, through the calculation formula selection control, selection of the first calculation formula defined for the reformed water flow rate to perform calculation based on the raw fuel flow rate (measured value) measured by the raw fuel flowmeter FM1 serving as a raw fuel flow rate measurer (refer to the section t2 in FIG. 4D).

More specifically, in the increase-control section t1 in FIG. 4D, the controller 20 transmits an instruction to the reformed water pump P1 to feed the reformed water at the flow rate of the reformed water calculated using, for example, the instructed flow rate (preset flow rate) of the raw fuel gas selected using the second calculation formula defined for the reformed water flow rate and the S/C ratio preset in accordance with the driving state of the fuel cell system without any delay from the timing to increase or decrease the target generation current level shown in FIG. 4A.

In response to the instruction for this requested reformed water flow rate and the resultant increase in the pump feed amount, the actual flow rate of the reformed water fed into the reformer 12 increases linearly and reaches the instructed target flow rate (preset flow rate) with substantially no delay from the instructed timing to increase the pump feed amount, as shown in the section t1 in FIG. 4E. This is due to rapid transmission of pressure through reformed water and thus due to a short response time taken by the pressure pump from receiving an instruction to increase or decrease the feeding pressure to increasing or decreasing the amount of water (flow rate) actually ejected from the ejection port.

In the section t1 in which the requested power level increases, the change (increase) rate of the reformed water (refer to FIG. 4E) is higher than that of the raw fuel (refer to FIG. 4C) as described above. In FIG. 4F, combining these graphs, the section t1 includes a hatched area in which the amount of reformed water is larger than a proper amount of reformed water (preset S/C ratio) corresponding to the inflow amount of the raw fuel.

In response to an increase in the requested power level from an external unit, the above control is performed for increasing the generation power level and the supply amount of raw fuel gas without the flow rate of the reformed water decreasing below the requested reformed water flow rate calculated using the S/C ratio during the increase of the generation current level. The vaporizing section in the reformer can thus avoid the amount of reformed water lacking for reforming the raw fuel. This structure reduces deterioration of the cell stack.

In the decrease-control section t2 in FIG. 4D in which the requested power level decreases, the controller 20 transmits an instruction to the reformed water pump P1 to feed the reformed water at the flow rate of the reformed water calculated using, for example, the measured flow rate of the raw fuel gas selected using the first calculation formula defined for the reformed water flow rate and the S/C ratio preset in accordance with the driving state of the fuel cell system.

The instruction provided to the reformed water pump P1 follows any decrease in the feeding pressure of the fuel pump. Thus, as shown in the section t2 in FIG. 4E, the actual flow rate of the reformed water fed into the reformer 12 reaches the instructed target flow rate (preset flow rate) after a delay from the instructed timing to decrease the pump feed amount and from a decrease in the raw fuel. A slight delay thus occurs from the timing at which the target generation current level shown in FIG. 4A decreases.

In the section t2 in which the requested power level decreases, the change (decrease) rate of the reformed water (refer to FIG. 4E) is lower than the change rate of the raw fuel (refer to FIG. 4C) because the change in (or the measured value of) the raw fuel is referred to and the value is fed back by following the change. In FIG. 4F, combining these graphs, the section t2 also includes a hatched area in which the amount of reformed water is larger than a proper amount of reformed water (preset S/C ratio) corresponding to the inflow amount of the raw fuel.

The control of the reformed water flow rate in the fuel cell system with the structure that forms the basis of the fuel cell system according to one or more embodiments of the present disclosure is performed or the instructive value is calculated, in the section t2 in which the requested power level decreases as shown in FIG. 5E, based on the instructed flow rate of the raw fuel gas (preset flow rate) in the same manner as in the section t1 in which the requested power level increases. An instruction is thus provided to the reformed water pump P1 at the same timing as the decrease in the target generation current level shown in FIG. 5A.

In the fuel cell system with the structure that forms the basis of the fuel cell system according to one or more embodiments of the present disclosure as shown in FIG. 5F, in the section t2 in which the requested power level decreases, the reformed water flow rate decreases before the decrease in the raw fuel flow rate in the reformer, thus causing the supplied amount of reformed water to temporarily decrease below the flow rate defined as the target S/C ratio, or causing the amount (or the flow rate) of reformed water to be lacking (in a dotted area in FIG. 5F).

In contrast, the fuel cell system 100 according to the present embodiment calculates the requested reformed water flow rate in the section t2 in which the requested power level decreases based on the measured flow rate of the raw fuel gas different from the flow rate defined for an increase in the requested power level, and thus reduces the likelihood that the reformed water flow rate decreases below the requested reformed water flow rate in the section t2. This structure thus reduces deterioration of the cell stack.

Although the measured value that decreases exponentially in accordance with the value measured successively by the flowmeter FM1 is used as the measured value of the raw fuel flow rate in the present embodiment as shown in FIG. 4D, the raw fuel flow rate may be measured in any other manner. For example, the raw fuel flow rate may be measured discontinuously or intermittently immediately after the requested power level starts decreasing.

The raw fuel flow rate measured discontinuously or intermittently in this manner does not cause the reformed water flow rate to decrease below the requested reformed water flow rate. Thus, the vaporizing section in the reformer can avoid the amount of reformed water lacking for reforming the raw fuel as in the example of FIG. 5F.

Second Embodiment

In a second embodiment, the controller 20 uses another method for calculating the reformed water flow rate in response to a generation power level requested from an external unit. The calculation method will be described.

In the second embodiment, the calculation formula defined for the reformed water flow rate uses a difference in an element(s) or item(s) for an increase and a decrease in the requested power level, rather than a different calculation formula being selected through the calculation formula selection control described above. More specifically, a different element or item is substituted into the above calculation formula for the requested reformed water flow rate in response to the increase or the decrease to provide an intended result. This equates to selecting a different calculation formula.

In the second embodiment, the calculation formula defined for the reformed water flow rate includes the flow rate of the raw fuel gas as an element defined differently for an increase and a decrease in the requested power level. Multiple elements including the flow rate of the raw fuel gas may be used as elements to be defined differently for the increase and the decrease.

The second embodiment will be described with reference to FIG. 6. The differences in the second embodiment from the first embodiment (FIG. 3) will be mainly described, with the same part as in the first embodiment not being described. In this flowchart, steps S14, S15, and S16 correspond to the calculation formula selection control or the calculation element selection control.

Figure 6:
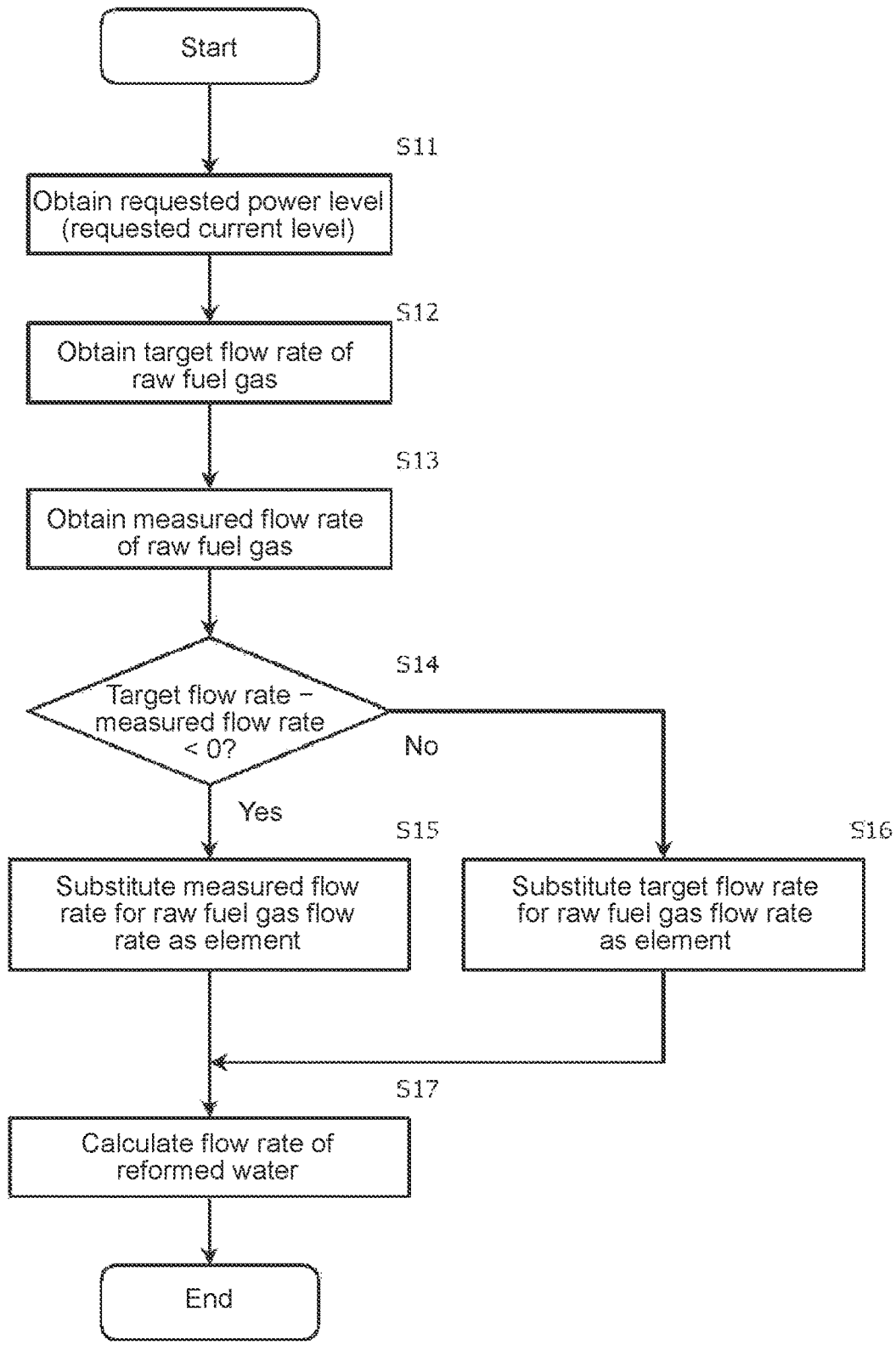
FIG. 6 is a flowchart of reformed water flow rate calculation in a second embodiment.

In step S11 in the flowchart of FIG. 6, information about the power level (current level) requested from an external unit is obtained when the fuel cell system 100 starts the power generation operation. In step S12, the target flow rate of the raw fuel gas to be used to generate the fuel gas (reformed gas) for supply to the cell stack 11 in response to the requested power level is determined through predetermined calculation. In subsequent step S13, the measured flow rate of the raw fuel gas is obtained by measurement performed by the raw fuel flowmeter FM1.

In step S14, the difference between the target flow rate and the measured flow rate of the raw fuel gas is calculated. When the difference between the target flow rate and the measured flow rate of the raw fuel gas is less than 0 (affirmative), the measured flow rate of the raw fuel gas is substituted for the flow rate of the raw fuel gas that is an element of the calculation formula in step S15.

When the difference between the target flow rate and the measured flow rate of the raw fuel gas is greater than or equal to 0 (negative), the preset value as the target flow rate of the raw fuel gas is substituted for the flow rate of the raw fuel gas that is an element of the calculation formula in step S16.

In step S17, the flow rate of the reformed water is finally calculated based on the substitute value for the flow rate of the raw fuel gas. As in the first embodiment, the vaporizing section in the reformer in the second embodiment can avoid the amount of reformed water lacking for reforming the raw fuel. This structure reduces deterioration of the cell stack.

In the same manner as in the flowchart (FIG. 3) in the first embodiment, after the processing in step S17, the control may return to the processing in step S11 to start a loop instead of ending the process.

The present disclosure may be implemented in the following forms.

A fuel cell system according to an aspect of the present disclosure includes a fuel cell that generates power using a fuel gas and an oxygen-containing gas, a reformer including a vaporizing section that vaporizes reformed water into steam and a reforming section that causes the steam to react with a raw fuel to generate the fuel gas through a steam reforming reaction, a raw fuel supply that supplies the raw fuel to the reforming section, a reformed water supply that supplies the reformed water, and a controller.

The controller has a plurality of calculation formulas for calculating an amount of reformed water to be used in the reforming section in response to a power level requested from an external unit. The plurality of calculation formulas include a formula to be selected in response to an increase in a requested current level from the external unit and a formula to be selected in response to a decrease in the requested current level from the external unit, and the formula to be selected in response to the increase is different from the formula to be selected in response to the decrease.

The fuel cell system according to the above aspect reduces the likelihood that the S/C ratio decreases in accordance with changes in the requested power level and reduces deterioration of the cell stack.

The present disclosure may be embodied in various forms without departing from the spirit or the main features of the present disclosure. The embodiments described above are thus merely illustrative in all respects. The scope of the present disclosure is defined not by the description given above but by the claims. Any modifications and alterations contained in the claims fall within the scope of the present disclosure.

REFERENCE SIGNS LIST 1 fuel cell module
11 cell stack
12 reformer
13 raw fuel supply
15 reformed water supply
20 controller
100 fuel cell system
F raw fuel channel
B1 fuel pump
FM1 flowmeter

What is claimed is:

1. A fuel cell system, comprising:
a fuel cell configured to generate power using a fuel gas and an oxygen-containing gas;
a reformer including a vaporizing section and a reforming section, the vaporizing section being configured to vaporize reformed water into steam, the reforming section being configured to cause the steam to react with a raw fuel to generate the fuel gas through a steam reforming reaction;
a raw fuel supply configured to supply the raw fuel to the reforming section;
a reformed water supply configured to supply the reformed water to the vaporizing section;
a controller having a plurality of calculation formulas for calculating an amount of reformed water to be used in the reforming section in response to a requested power level from an external unit, the plurality of calculation formulas including a formula to be selected in response to an increase in a requested current level from the external unit and a formula to be selected in response to a decrease in the requested current level from the external unit, the formula to be selected in response to the increase being different from the formula to be selected in response to the decrease; and
a raw fuel flow rate measurer configured to measure a flow rate of the raw fuel supplied to the reforming section,
wherein in response to a decrease in the requested power level from the external unit, the controller selects, from the plurality of calculation formulas, a first reformed water flow rate calculation formula to calculate an amount of reformed water per unit time to be used in the reforming section based on the flow rate of the raw fuel measured by the raw fuel flow rate measurer, and
the controller reduces the amount of reformed water supplied to the reformer after a delay from a timing at which a target generation current level decreases.

2. The fuel cell system according to claim 1, wherein in response to an increase in the requested power level from the external unit, the controller selects, from the plurality of calculation formulas, a second reformed water flow rate calculation formula to calculate an amount of reformed water per unit time to be used in the reforming section based on a flow rate of the raw fuel predetermined in accordance with a generation power level.

3. A fuel cell system, comprising:
a fuel cell configured to generate power using a fuel gas and an oxygen-containing gas;
a reformer including a vaporizing section and a reforming section, the vaporizing section being configured to vaporize reformed water into steam, the reforming section being configured to cause the steam to react with a raw fuel to generate the fuel gas through a steam reforming reaction;
a raw fuel supply configured to supply the raw fuel to the reforming section;
a reformed water supply configured to supply the reformed water to the vaporizing section; and
a controller having a calculation formula for calculating an amount of reformed water to be used in the reforming section in response to a requested power level from an external unit,
wherein when the calculation formula has a plurality of elements, the controller selects, based on an increase or a decrease in the requested power level from the external unit, an element from the plurality of elements of the calculation formula in response to the increase in the requested power level, and an element different from the element to be selected for the increase from the plurality of elements in response to the decrease in the requested power level, the controller selects, as the element of the calculation formula selected for the decrease, a measured flow rate of the raw fuel supplied to the reforming section in response to a decrease in the requested power level, and the controller reduces the amount of reformed water supplied to the reformer after a delay from a timing at which a target generation current level decreases.

4. The fuel cell system according to claim 3, wherein the controller selects, as the element of the calculation formula selected for the increase, a flow rate of the raw fuel predetermined in accordance with a value of the requested power level in response to an increase in the requested power level.

\* \* \* \* \*